US007076485B2

(12) United States Patent
Bloedorn

(10) Patent No.: US 7,076,485 B2
(45) Date of Patent: Jul. 11, 2006

(54) METHOD AND SYSTEM FOR FINDING SIMILAR RECORDS IN MIXED FREE-TEXT AND STRUCTURED DATA

(75) Inventor: Eric Bloedorn, Fairfax, VA (US)

(73) Assignee: The MITRE Corporation, McLean, VA (US)

( * ) Notice: Subject to any disclaimer, the term of this patent is extended or adjusted under 35 U.S.C. 154(b) by 520 days.

(21) Appl. No.: 10/091,932

(22) Filed: Mar. 6, 2002

(65) Prior Publication Data

US 2002/0152208 A1 Oct. 17, 2002

Related U.S. Application Data

(60) Provisional application No. 60/273,807, filed on Mar. 7, 2001.

(51) Int. Cl.
*G06F 7/00* (2006.01)
(52) U.S. Cl. .............................. 707/6; 707/1; 707/104.1
(58) Field of Classification Search ......... 707/1–104.1, 707/200–205; 370/229, 235, 238, 351, 389, 370/392; 704/1–4, 9, 25–26; 706/45; 709/200, 709/217–218, 223–224
See application file for complete search history.

(56) References Cited

U.S. PATENT DOCUMENTS

| 5,778,388 | A | * | 7/1998 | Kawamura et al. | ......... 707/203 |
| 5,960,430 | A | * | 9/1999 | Haimowitz et al. | ............ 707/6 |
| 6,026,388 | A | * | 2/2000 | Liddy et al. | .................... 707/1 |
| 6,112,181 | A | * | 8/2000 | Shear et al. | .................... 705/1 |
| 6,260,044 | B1 | * | 7/2001 | Nagral et al. | ............... 707/102 |
| 6,523,019 | B1 | * | 2/2003 | Borthwick | .................... 706/45 |
| 6,611,825 | B1 | * | 8/2003 | Billheimer et al. | ........... 706/45 |
| 6,735,717 | B1 | * | 5/2004 | Rostowfske et al. | .......... 714/13 |
| 2002/0002479 | A1 | * | 1/2002 | Almog et al. | .................. 705/8 |
| 2003/0074368 | A1 | * | 4/2003 | Schuetze et al. | ........ 707/103 R |
| 2003/0074369 | A1 | * | 4/2003 | Schuetze et al. | ........ 707/103 R |

OTHER PUBLICATIONS

Schuetze et al., "System and Method for Quantitative LY Representating Data Objects in Vector Space", USPAP 200030074368.*
Almog et al., "Career Management System", Jan. 3, 2002, USPAP. 2002/0002479.*
Bloedorn, E., "Mining Aviation Safety Data: A Hybrid Approach," Armed Forces Communications and Electronics Association (AFCEA) Third Federal Data Mining Symposium, Washington D.C., Mar. 28-29, 2000.

(Continued)

*Primary Examiner*—Luke S Wassum
*Assistant Examiner*—Linh Black
(74) *Attorney, Agent, or Firm*—Hamilton, Brook,Smith & Reynolds, P.C.

(57) ABSTRACT

A technique for data mining where the available data contains both structured as well as unstructured (free-text) data. The present invention combines together the information available from different types of data to provide a single similarity score indicating the degree of similarity between records. Thus, a data evaluation application selects two records from a database and compares corresponding fields from the two records. The application determines whether to apply a nominal matching process, an ordinal matching process, or a vector-space matching process depending on the type of data in each pair of corresponding fields. The application sums the matching scores for all the fields in the records to compute the similarity score.

14 Claims, 2 Drawing Sheets

OTHER PUBLICATIONS

Manning, C., and Schutze, H., *Foundations of Statistical Natural Language Processing,* (Cambridge, MA: MIT Press), pp. 539-543 (2000).

(Replacement Reference) Manning, C., and Schutze, H., Foundations of Statistical Natural Language Processing, (Cambridge, MA: MIT Press), pp. 539-544 (2000).

* cited by examiner

METHOD AND SYSTEM FOR FINDING SIMILAR RECORDS IN MIXED FREE-TEXT AND STRUCTURED DATA

RELATED APPLICATION

This application claims the benefit of U.S. Provisional Application No. 60/273,807, filed on Mar. 7, 2001. The entire teachings of the above application is incorporated herein by reference.

BACKGROUND OF THE INVENTION

Data mining is broadly defined as the search for interesting patterns from large amounts of data. Techniques for performing traditional data mining come from a wide variety of disciplines including traditional statistics, machine learning, and information retrieval. This variety of available techniques means that for any given application there is probably some traditional data mining technique for finding interesting patterns. But the variety of techniques also means there exists a confusing array of possible data mining tools and approaches for any given application.

SUMMARY OF THE INVENTION

This problem of a variety of data mining techniques is exacerbated when the available data contains both structured as well as unstructured (e.g., free-text) data. For example, in the field of aviation safety, data of airline safety incidents contains records which include both free text descriptions of events as well as structured fields, including, for example, phase-of-flight and location. Performing separate analyses using different traditional techniques on these different sources of data does not fully exploit the available information. For example, one approach may cluster safety records without regard to narratives. However, such clustering can inappropriately match reports of total electrical failure with human factors problems. Unfortunately, currently available tools typically provide little support for combined analysis of the available information.

The present invention provides an approach to combining the information available from records containing different types of data, such as structured and unstructured data in the same record, to obtain a single similarity score measuring the degree of similarity between records. In one aspect, the present invention accesses two of the records from the database, and evaluates a match between the two records as a weighted function of two or more fields. A matching process is selected as appropriate from among a group of matching processes including strict Boolean, ordinal, and vector-based matching processes. When a strict Boolean matching process is selected, the present invention applies a match function as an exact match test. When an ordinal matching process is selected, the present invention applies a match function that makes use of information concerning the size and ordering of the data domain. When a vector-based matching process is selected, the present invention applies a match function that uses a vector space frequency test.

In particular, the present invention applies the matching process to determine a match score for two corresponding fields, which are selected from corresponding locations in each of the two records. For example, the corresponding fields of the two records may be the third field in each of the two records. These fields contain corresponding data types, such as both having unstructured free-text data.

In one aspect, the present invention selects the matching process based on the data type shared by both of the two fields. Generally, the data is structured data (nominal or ordinal data) or unstructured data (free-text data). When a Boolean matching process is selected, the data is nominal data, such as the location (e.g., airport) of an air safety incident. When an ordinal matching process is selected, the data is capable of being ordered. For example, the data is interval data, such as string (text) data that indicates the phase of an airplane flight, which can be ordered from the first phase (e.g., take-off) to the last phase of the flight (e.g., landing). Alternatively, ordered data is numeric data, such as the number of hours flown, which can be ranked by numeric value. When a vector-based matching process is selected, the data type of both of the two fields specifies text data. For example, a free text data field contains a text description of the airline safety incident, which is not suitable for an ordinal, nominal, or other structured analysis.

In another aspect, the present invention evaluates the match between the two records by calculating a similarity score (e.g., ranging from 0 to 100) between the two records as the weighted match between each (corresponding) field within those records. When doing this match, the present invention uses matching functions that are appropriate for the type of attribute (e.g., nominal, ordinal, or vector space). The match score produced by each matching function is weighted by a predefined weighting value. For example, an airline safety officer weights the matching score for each field based on a determination of the importance of that field.

Generally, in alternate aspects, the database may be implemented in various ways. In a particular aspect, the database is a relational database; the records are tuples; and the fields are attributes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
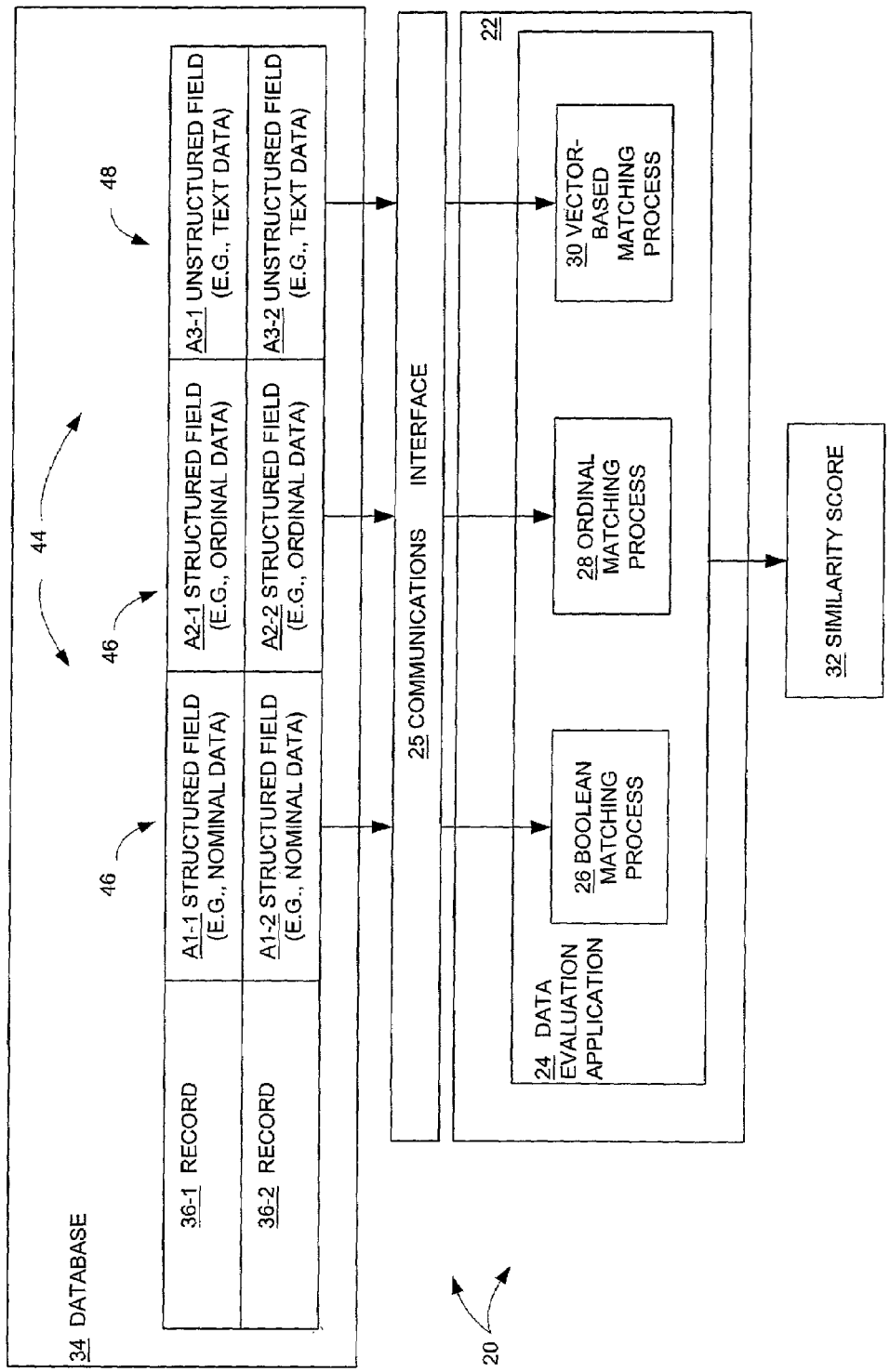
FIG. 1 is a block diagram of a data processing system according to a preferred embodiment of the invention.

FIG. 1 is a block diagram of a data processing system 20 for evaluating whether records 36 (e.g., 36-1, 36-2) are similar in a database 34 for a preferred embodiment of the invention. The data processing system 20 (e.g., a digital computer system) includes a digital processor 22, such as an Intel Pentium microprocessor, and a communications interface 25, such as a computer bus or a Network Interface Card (NIC). The digital processor 22 hosts and executes a data evaluation application 24 stored in a memory (e.g., Random Access Memory or RAM, and/or other data storage devices, such as a disk) for evaluating the fields 44 of the data records 36 to determine if the records 36 are similar. It is to be understood that when the data evaluation application 24 is referred to as performing some function, the digital processor 22 performs that function based on instructions of the data evaluation application 24.

The database 34 stores data as records 36 (e.g., 36-1, 36-2) on a data storage device, such as a hard disk drive, tape, CD-ROM, diskette, or other device suitable for storing digital data. Each record 36-1, 36-2 includes data fields 44, which may include either structured data 46 (e.g., A1-1, A2-1, A1-2, A2-2) or unstructured data 48 (e.g., A3-1 and A3-2) or both. In one embodiment, records 36 are rows in the database 34, and fields 44 are columns in the database 34. The structured data 46 include data in predefined formats or types, such as a nominal typed attribute (e.g., A1-1 and A1-2) or ordinal data (e.g., A2-1 and A2-2), such as interval data based on numeric or string-based values indicating data or values capable of being ranked or ordered. The present invention does not require that the fields 44 be in any particular order or particular types of data be stored in particular fields 44. For example, the sequences of fields, A1-1 for nominal data, A2-1 for ordinal data, and A3-1 for text data, is only an example of a sequence for fields 44 in a record 36-1. The present invention does not limit the number of fields to three for each record 36-1, 36-2 as shown in FIG. 1, or to any specific number of fields. Furthermore, the present invention does not require that each record 44 contain the three specific types of data (nominal, ordinal, or text) as shown as an example in FIG. 1.

In one embodiment, the records 36 and fields 44 of the database 34 are organized as files. In another embodiment, the database 34 is a relational database, the files are relations, the records 36 are tuples, and the fields 44 are attributes of the tuples. In a further embodiment, the database 34 can be any type of database (e.g., object oriented or other database) that allows for accessing defined quantities of data (e.g., object attributes or fields 44) that have the same type of information (such as location of an air safety incident) within larger groupings of data (e.g., objects or records 44).

The data evaluation application 24 includes functional software modules (e.g., programs, procedures, routines, objects, or other software entities) for a Boolean matching process 26, ordinal matching process 28, and vector-based matching process 30. The Boolean matching process 26 performs a matching test for nominal data as indicated, for example, by the input into the Boolean matching process 26 from nominal data fields A1-1 and A1-2. The ordinal matching process 28 performs a matching test for ordinal data, such as ordinal data fields A2-1 and A2-2. The vector-based matching process 30 performs a matching text for unstructured (e.g., free-text) data, such as for text data fields A3-1 and A3-2. The matching processes 26, 28, and 30 are discussed in more detail in connection with FIG. 2.

In other embodiments of the invention, the data evaluation application 24 and/or any or all of its component matching processes 26, 28, and 30 are implemented in hardware, such as Integrated Circuits (ICs), Application Specific Integrated Circuits (ASICs) and/or Programmable Gate Arrays (PGAs).

The communications interface 25 manages communications between the data evaluation application 24 and the database 34. For example, the communications interface 25 is a computer bus providing access to a database 34 located in a data storage system that is an integral part of (or closely coupled to) the data processing system 20. In another example, the communications interface 25 is a network interface card (NIC) that provides access to the database 34 over a Local Area Network (LAN) such as one using the Ethernet protocol, or over an Internet Protocol (IP) network such as the Internet. In this example, the database 34 is stored on data storage local to another computer system or database server connected to the LAN or the IP network.

In a preferred embodiment, the hybrid approach of the present invention described herein provides support for data evaluation and data mining by airline safety officers. Traditionally, one task that the safety officers are repeatedly called on to perform is to find records 36 of incidents (e.g., a close encounter between two airplanes or other airline safety incident) that are similar to those new incidents that just recently occurred. If the new event is found to be similar to events described in some past records 36, the new event may be part of a larger, more serious pattern. When this is the case, a safety officer may have to review and update past actions taken to prevent this type of incident from recurring. If, on the other hand, the incident is anomalous, the safety officer may note and close the incident, or simply announce the incident to the relevant departments and/or organizations as a warning.

This determination of record similarity is not well supported by the traditional data evaluation tools available to the safety officer. With such traditional tools, safety officers could perform queries on both the structured fields 44 (e.g., A1-1, A2-1, A1-2, A2-2), and, unstructured, free-text fields 44 (e.g., A3-1, A3-2) of records 36 in a database 34 (e.g., airline safety incident database), but typically only could obtain responses with exact matches. Similarity of match (rather than exact matches) between records 36 is not typically supported by the traditional tools.

To provide safety officers with a tool that found similar records 36 from mixed kinds of data such as free-text data (as in fields A3-1 and A3-2) and structured data 46 (as in fields A1-1, A2-1, A1-2, A2-2), the present invention provides a hybrid approach. In this hybrid approach, a match or similarity score 32 between two records 36 is evaluated as the weighted match between each of the available fields 44 within those records 36. When doing this match, the present invention uses methods that are appropriate for the data type (e.g., nominal, ordinal, or text) of the fields 44 being matched.

The similarity score 32 is a score that indicates the degree of similarity between two records 36 (e.g., 36-1 and 36-2), such as a by a numerical value that can be compared to (determined to be greater than, equal to, or less than) another similarity score 32 for two records 36 (e.g., 36-1 and some other record 36 other than 36-2).

More precisely, the data evaluation application 24 evaluates the similarity score 32 (ranging from 0 to 100 in a preferred embodiment) for two records as follows:

$$\text{sim}(\text{record}_i, \text{record}_j) = w_1 * \text{match}(a_{1i}, a_{1j}) + w_2 * \text{match}(a_{2i}, a_{2j}) + \ldots w_n * \text{match}(a_{ni}, a_{nj}) \qquad (1)$$

In equation (1), sim is a similarity function that determines the similarity score 32 for two records 44; record$_i$ 44 is the record identified by the iterator i in the database 34; record$_j$ 44 is the record identified by the iterator j in the database 34; and the symbol "a" indicates a field in the record 36.

For example, the symbol $a_{1i}$ indicates the first field 44 in record$_i$ 36, which is evaluated for degree of similarity (match score) with the corresponding field 44 in the other record 36, which is indicated by $a_{1j}$, which is the first field in record$_j$ 36. The word "match" indicates a match function, and the symbol "w" indicates a weight provided for each match score produced as a result of each match function. The airline safety officer or other system architect typically assigns weights based on what fields are deemed most important.

Figure 2:
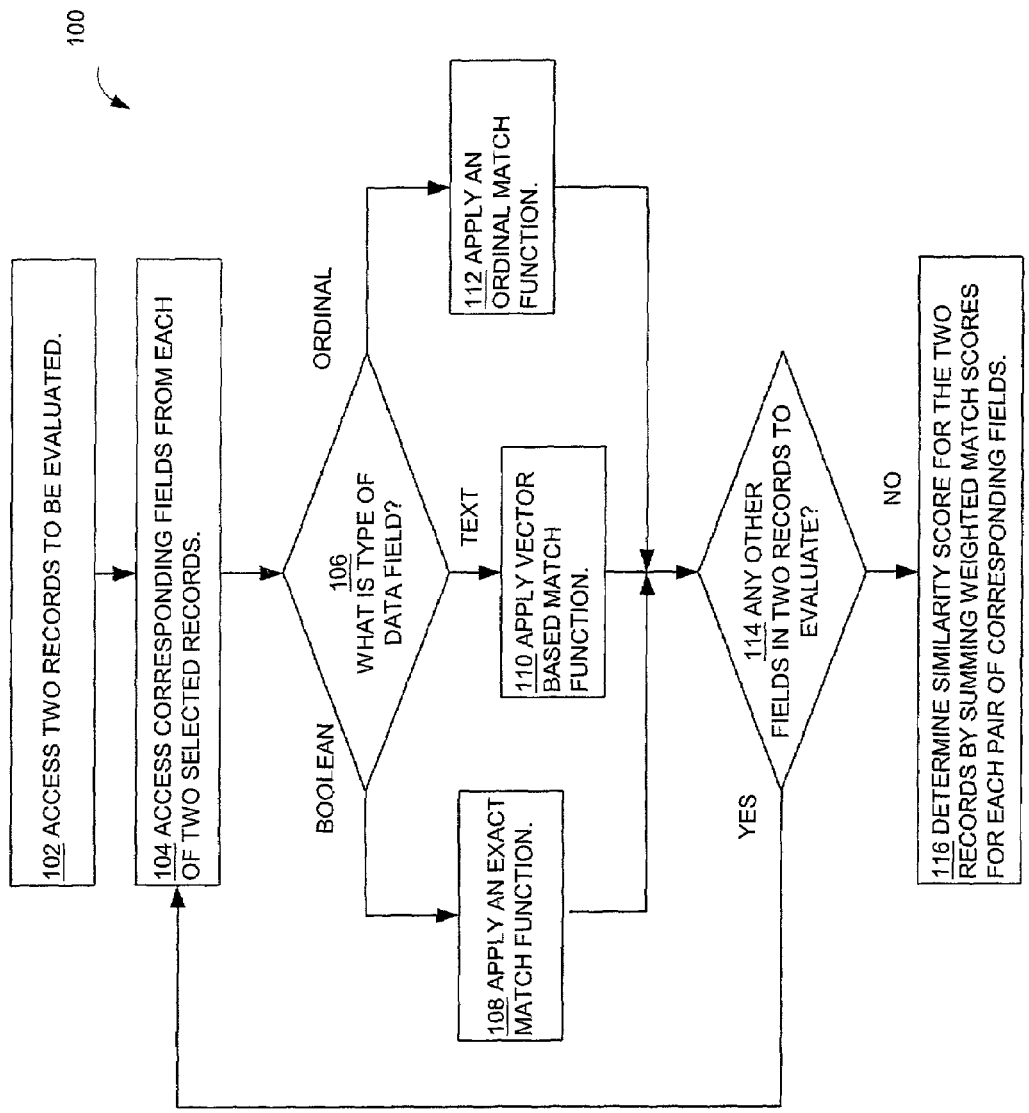
FIG. 2 is a flowchart of a procedure for determining whether records are similar in a database.

FIG. 2 is a flowchart of a procedure 100 for determining whether records 36 are similar in the database 34.

In step 102, the communications interface 25 accesses two records 36 from the database 34 for evaluation by the data evaluation application 24. For example, an airline safety officer may select two records 36 and specify the records 36 (e.g., through a user interface) to the data evaluation application 24 to be accessed. One record 36 may be a recently occurring airline safety incident, and the other record 36 may be a previous incident to be evaluated for similarity to the first record 36. In another example, airline safety officer may instruct the data evaluation application 24 to compare every record 36 in the database 34 to a given record 36 (e.g., new record 36 of an airline safety incident), and the data evaluation application 24 proceeds to compare the given record 36 on a pair-wise basis to every other record in the database 34.

In step 104, the data evaluation application 24 selects corresponding fields 44 (e.g., A1-1 and A1-2) from each of the two accessed records 36 (e.g., 36-1 and 36-2).

For example, the data evaluation application 24 accesses structured fields A1-1 and A1-2 containing nominal data (e.g., the location or name of an airport, such as "BWI" airport for the Baltimore/Washington International airport).

In step 106, the data evaluation application 24 determines what type of data is in the accessed fields 44. Based on this determination the data evaluation application 24 applies a matching process 26, 28, or 30 that is suitable for evaluating that type of data, and proceeds to steps 108 (for nominal data), step 110 (for unstructured text data), or step 112 (for ordinal data). For example, the data evaluation application 24 determines that fields A1-1 and A1-2 contain nominal data (e.g., nominal typed attribute such as location) and the procedure 100 proceeds to step 108.

In step 108, the data evaluation application 24 selects the Boolean matching process 26, and applies a strict or an exact match function to evaluate the data in the fields 44. Thus, in strict or exact matching, the match Boolean function takes the following form:

$$\text{Match}(a_{ni}, a_{nj}) = 1 \text{ if } a_{1i} = a_{1j} \text{ else} = 0 \quad (2)$$

For example, if the nominal attribute type for the field 44 is for location (e.g., if the location of the airline safety incident was "BWI"), then the match function returns a true (1) value only if a specific location is matched (a match to "BWI").

In step 110, the data evaluation application 24 has selected (in step 106) the ordinal matching process 28, and applies an ordinal match function to evaluate the data in the fields 44.

When the data are ordered, the system requires information from the user (e.g., airline safety officer) concerning the size and ordering of the domain. This matching is appropriate for any ordinal or interval type of data from numeric (e.g., Number_hours_flown) to string-based (Phase_of_flight) data. Given the size of the domain, |Domain a|, the ordinal match function is $$\text{Match}(a_{ni}, a_{nj}) = 1 - ((a_{ni} - a_{nj}) / |\text{Domain } a_n|) \quad (3)$$

In step 112, the data evaluation application 24 has selected (in step 106) the vector-based matching process 30 for textual data, and applies a vector space match function to evaluate the data in the fields 44. In alternate embodiments, there are a number of different weighting schemes that could be supported, but by default, in a preferred embodiment, the data evaluation application 24 uses a tf-idf (term frequency inverse document frequency) approach. The term "document" as used herein with regard to the tf-idf approach refers to a record 36.

In the vector space matching approach of step 112, a vector with length equal to the size of the vocabulary is built for each field 44, such as an unstructured text field 48 (based on a vocabulary of unique words extracted from all the records 36 for that field 48). The value at position x (indicating the position of a word in a field 44 in a record 36) represents the ratio of the number of times that word appears in the document (or record 36) (term frequency or tf), and the number of times that word appears in the collection of documents (or collection of records 36) in the database 34 (document frequency or df). Geometrically speaking the overall document match is the distance in this large dimensional vector space between these two vectors, or the sum of the products over the square root of the sum of the squares.

$$\text{Match}(a_{ni}, a_{nj}) = \sum_{x=1 \text{ to } V} \frac{weight_{mix} * weight_{njx}}{\sqrt{(weight_{mix})^2 * (weight_{njx})^2}} \quad (4)$$

where:
V=size of vocabulary, $weight_{nix}$=(weight of word x in field n of record i) and the default weighting method is tf.idf= (term frequency$_{ix}$/document frequency$_x$)

For the vector-based matching process 30, the data evaluation application 24 currently supports stemming, three different weighting schemes, the use of a stop word list, and the use of a thesaurus file for matching synonymous words. In stemming, words that are the same except for different endings (morphological variants, e.g., "engineered", and "engineering") all map to the same base term (in this case, "engineer"). Stop word lists are used to filter out words that are unlikely to add any additional meaning to the text. Examples of stop words are "and" and "the".

Examples of weighting schemes suitable for use with the present invention are described in pages 539–544 of "Foundations of Statistical Natural Language Processing" by Christopher Manning and Hinrich Schutze, MIT Press, Cambridge, Mass., 2000, the entire teachings of which are incorporated by reference.

In step 114, the data evaluation application 24 determines if there are any other fields 44 in the two records 36 to evaluate. If there are other fields 44 to evaluate in the two records 36, the data evaluation application 24 proceeds to step 104 to evaluate the next pair of unevaluated fields 44 by following steps 104 through step 112. If there are no other fields 44 to evaluate in the two records 36, then the data evaluation application 24 proceeds to step 116.

In step 116, the data evaluation application 24 determines the similarity score 32 for the two records 36 by summing the weighted match scores for each pair of corresponding fields 44, as described above for equation (1).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for determining whether records are similar in a database containing both structured and unstructured, free-text data, the method comprising the steps of:

accessing two of the records from the database for evaluation;

evaluating a match between the two records as a weighted match between each of a plurality of available fields, such that a matching process is selected as appropriate from among a group of matching processes including strict Boolean, ordinal, and vector-based matching processes, wherein:

when a strict Boolean matching process is selected, applying a match function as an exact match test, when an ordinal matching process is selected, applying a match function that makes use of information concerning the size and ordering of the data domain, and when a vector-based matching process is selected applying a match function that uses a vector space frequency test; and calculating a similarity score between the two records, as follows:

$$\text{sim}(\text{record}_i, \text{record}_j) = w_1 * \text{match}(a_{1i}, a_{1j}) + w_2 * \text{match}(a_{2i}, a_{2j}) + \ldots w_n * \text{match}(a_{ni}, a_{nj})$$

wherein sim is a similarity function that determines the similarity score for the two records, $\text{record}_i$ is a first record of the two records and is identified in the database by an iterator i, $\text{record}_j$ is a second record of the two records and is identified in the database by an iterator j, iterator n identifies a field position for a given field $a_{ni}$ in the record$_i$ and a corresponding field position for a given field $a_{nj}$ in the record$_j$, match indicates the match function, and a symbol $w_n$ indicates a predefined weight for each result of each match function.

2. The method of claim 1 wherein the step of evaluating a match between the two records comprises applying the matching process to determine a match score for two corresponding fields of the plurality of available fields, the two corresponding fields selected from corresponding locations in each of the two records.

3. The method of claim 1 wherein the step of evaluating a match between the two records comprises selecting the matching process based on a common data type shared by both of two fields of the plurality of available fields accessed in the two records.

4. The method of claim 3 wherein when a Boolean matching process is selected, the data type of both of the two fields specifies nominal data.

5. The method of claim 3 wherein when an ordinal matching process is selected, the data type of both of the two fields specifies data capable of being ordered.

6. The method of claim 3 wherein, when a vector-based matching process is selected, the data type of both of the two fields specifies text data.

7. The method of claim 1 wherein the database is a relational database, the records are tuples, and the fields are attributes.

8. A data processing system for determining whether records are similar in a database containing both structured and unstructured, free-text data, the data processing system comprising:

a communications interface for communicating with the database; and a processor coupled to the communications interface, the processor hosting and executing a data evaluation application that is configured to:

(a) access two of the records from the database for evaluation, (b) evaluate a match between the two records as a weighted match between each of a plurality of available fields, such that a matching process is selected as appropriate from among a group of matching processes including strict Boolean, ordinal, and vector-based matching processes, wherein:

when a strict Boolean matching process is selected, apply a match function as an exact match test, when an ordinal matching process is selected, apply a match function that makes use of information concerning the size and ordering of the data domain, and when a vector-based matching process is selected, apply a match function that uses a vector space frequency test; and (c) calculate a similarity score between the two records, as follows:

$$\text{sim}(\text{record}_i, \text{record}_j) = w_1 * \text{match}(a_{1i}, a_{1j}) + w_2 * \text{match}(a_{2i}, a_{2j}) + \ldots w_n * \text{match}(a_{ni}, a_{nj})$$

wherein sim is a similarity function that determines the similarity score for the two records, $\text{record}_i$ is a first record of the two records and is identified in the database by an iterator i, $\text{record}_j$ is a second record of the two records and is identified in the database by an iterator j, iterator n identifies a field position for a given field $a_{ni}$ in the record$_i$ and a corresponding field position for a given field $a_{nj}$ in the record$_j$, match indicates the match function, and a symbol $w_n$ indicates a predefined weight for each result of each match function.

9. The data processing system of claim 8 wherein the data evaluation application is configured to apply the matching process to determine a match score for two corresponding fields of the plurality of available fields, the two corresponding fields selected from corresponding locations in each of the two records.

10. The data processing system of claim 8 wherein the data evaluation application is further configured to select the matching process based on a common data type shared by both of two fields of the plurality of available fields accessed in the two records.

11. The data processing system of claim 10 wherein when the data evaluation application selects a Boolean matching process, the data type of both of the two fields specifies nominal data.

12. The data processing system of claim 10 wherein when the data evaluation application selects an ordinal matching process, the data type of both of the two fields specifies data capable of being ordered.

13. The data processing system of claim 10 wherein, when the data evaluation application selects a vector-based matching process, the data type of both of the two fields specifies text data.

14. The data processing system of claim 8 wherein the database is a relational database, the records are tuples, and the fields are attributes.

* * * * *